United States Patent
Frankle

[15] 3,656,465
[45] Apr. 18, 1972

[54] INTAKE AIR HEATER FOR AN AIR-COMPRESSING INJECTION INTERNAL COMBUSTION ENGINE

[72] Inventor: Gerhard Frankle, Grunbach Kreis, Waiblingen, Germany

[73] Assignee: Daimler-Benz Aktiengesellschaft, Stuttgart-Unterturkheim, Germany

[22] Filed: Oct. 28, 1970

[21] Appl. No.: 84,633

[30] Foreign Application Priority Data

Oct. 29, 1969 Germany ................. P 19 54 497.9

[52] U.S. Cl. ............... 123/179 H, 123/198 DB, 123/179 G, 123/122 D
[51] Int. Cl. ............................ F02m 31/04, F02n 17/00
[58] Field of Search ........... 123/179 H, 179 G, 179 R, 122 G, 123/198 D, 198 DB

[56] References Cited

UNITED STATES PATENTS

| 3,020,903 | 2/1962 | Kloss | 123/179 H X |
| 3,024,777 | 3/1962 | Baker | 123/122 G |

*Primary Examiner*—Al Lawrence Smith
*Attorney*—Craig, Antonelli & Hill

[57] ABSTRACT

A suction air heater for an air-compressing injection-type internal combustion engine which includes a spark plug and fuel injection nozzle arranged in an air suction pipe and an electric motor driving a fuel pump; an oil pressure switch controlling the operation of the heater is provided in the internal combustion engine which assures that energy is supplied to the electric motor when the engine is running; a temperature-dependent switch is series-connected with the oil pressure switch for selectively opening or closing the circuit of the electric motor while a starter switch may be connected in parallel with the oil pressure switch.

9 Claims, 1 Drawing Figure

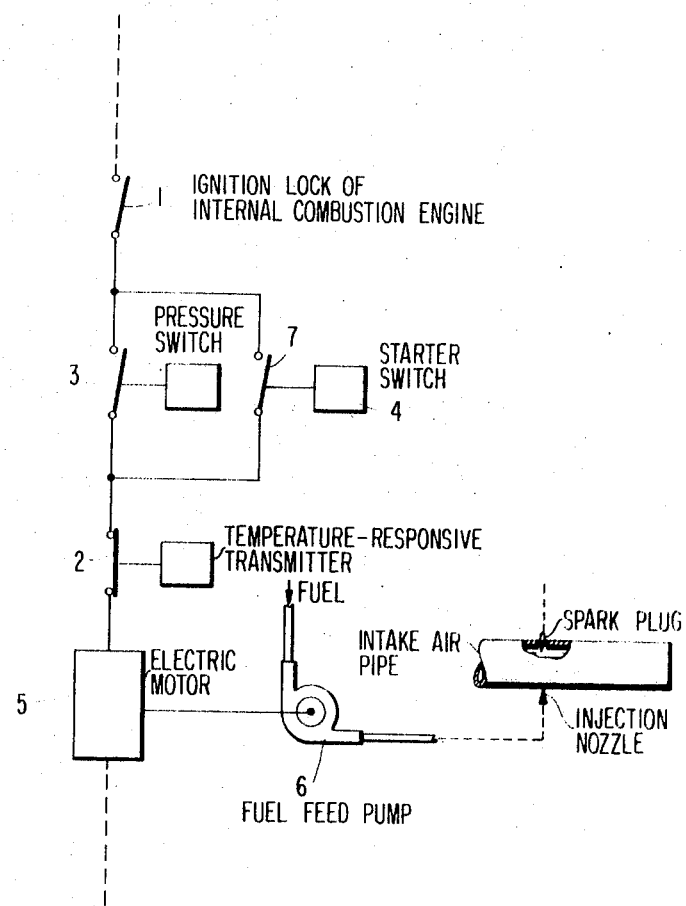

INTAKE AIR HEATER FOR AN AIR-COMPRESSING INJECTION INTERNAL COMBUSTION ENGINE

The present invention relates to an intake air heater for air-compressing injection internal combustion engine, essentially consisting of a fuel injection nozzle and spark plug arranged in an intake or suction pipe and of a feed pump driven by an electric motor.

In internal combustion engines operating according to the diesel process, intake air heaters have become known for the improvement of the starting behavior, in which the fuel is combusted in the air intake or suction pipe of the internal combustion engine in order to increase the intake air temperature.

The intake or suction air heater thereby not only serves as starting assist of internal combustion engines, but it may always be turned on in conjunction with multi-fuel engines when the compression end temperature is too low.

In order to assure a completely satisfactory switching-on of the intake air heater during the operation of the internal combustion engine, the present invention is concerned with the task to provide an installation that completely and fully satisfies the requirements made thereof.

underlying problem is solved according to the present invention in that an oil pressure switch controlling the operation of the intake air heater is arranged at the internal combustion engine which ensures the current supply to the electric motor for the feed pump with a running internal combustion engine.

In an advantageous construction of the present invention, a transmitter controlled in dependence on temperature may be arranged in series with the oil pressure switch which opens or closes the electric circuit to the electric motor of the fuel pump.

By reason of the present invention the oil pressure switch may be arranged in parallel to the electric starter switch of the internal combustion engine.

Accordingly, it is an object of the present invention to provide a suction air heater system for an air-compressing internal combustion engine of the injection type which avoids by simple means the aforementioned shortcomings and drawbacks encountered heretofore.

Another object of the present invention resides in a suction air heater system for an internal combustion engine of the aforementioned type which assures a completely satisfactory switching on and off of the suction air heater system during the operation of the internal combustion engine, taken into due consideration the requirements made thereof.

A further object of the present invention resides in an installation of the aforementioned type which is simple in construction and reliable in operation.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic control circuit diagram of the installation according to the present invention.

Referring now to the drawing, a conventional oil pressure switch 3 is arranged in the control circuit of a suction air heater, shown only schematically and of conventional construction between an ignition lock 1 and a conventional transmitter 2 controlled in dependence on temperature. An electric starter switch 4 is connected in parallel to the oil pressure switch 3. The transmitter 2 is connected with a feed or fuel pump 6 driven by an electric motor 5.

When the ignition lock 1 is turned on, a voltage exists in the starter switch 4. If the starter switch 4 is now actuated, then the current circuit to the electric motor 5 is closed by way of the transmitter 2 so that the feed pump 6 is set into operation and fuel is supplied to the suction air heater whereby the fuel is atomized and at the same time ignited there at.

As a result of the starting of the internal combustion engine, the oil pressure switch 3, which is connected with the oil circulatory system of the internal combustion engine, is closed whereby, also after termination of the starting operation (with contact 7 open), the suction air heating system continues to operate for such length of time until the transmitter 2 terminates the operation or in case of need permits the same to commence anew.

It is simultaneously assured by the oil pressure switch 3 that the suction air heating system can operate only with a running internal combustion engine.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

What I claim is:

1. An intake air heater system for an air-compressing injection internal combustion engine which includes a fuel injection nozzle arranged in a suction air pipe and a spark plug as well as a feed pump driven by an electric motor, characterized in that an oil pressure switch means operable to control the operation of the suction air heater is arranged at the internal combustion engine and is connected in a control circuit means for the electric motor to ensure a current supply to said electric motor with a running internal combustion engine.

2. An intake air heater according to claim 1, characterized in that said oil pressure switch means operates in dependence of the pressure in the oil circulatory system of the engine.

3. An intake air heater according to claim 2, characterized in that a transmitter means controlled in dependence on temperature is series-connected with the oil pressure switch means, said transmitter means being operable to selectively open or close the control circuit means to the electric motor.

4. An intake air heater according to claim 3, characterized in that the oil pressure switch means is connected in parallel to an electric starter switch means of the internal combustion engine.

5. An intake air heater according to claim 1, characterized in that a transmitter means controlled in dependence on temperature is series-connected with the oil pressure switch means, said transmitter means being operable to selectively open or close the control circuit means to the electric motor.

6. An intake air heater according to claim 1, characterized in that the oil pressure switch means is connected in parallel to an electric starter switch means of the internal combustion engine.

7. An intake air heating system for an air-compressing internal combustion engine with fuel injection, which includes a fuel pump for an injection nozzle arranged in an air suction pipe of the engine, spark plug means for igniting the injected fuel and a control circuit for an electric motor drivingly connected with the fuel pump, characterized in that the control circuit includes an oil pressure switch means operable to close the circuit and thus provide electrical energy for the electric motor in the presence of a predetermined pressure in the oil circulatory system of the engine.

8. A system according to claim 7, characterized in that said circuit includes, connected in series, a switch operated by an ignition lock, said oil pressure switch means and a further switch means selectively opened or closed in dependence on temperature.

9. A system according to claim 8, characterized in that a switch actuated by a starter means is connected in parallel with the oil pressure switch means.

* * * * *